US006304938B1

(12) United States Patent
Srivastava

(10) Patent No.: US 6,304,938 B1
(45) Date of Patent: Oct. 16, 2001

(54) DETECTING A STATE CHANGE IN A LOCK STRUCTURE TO VALIDATE A POTENTIAL DEADLOCK

(75) Inventor: Alok Kumar Srivastava, Santa Clara, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/256,330

(22) Filed: Feb. 23, 1999

(51) Int. Cl.[7] .................. G06F 13/00; G06F 9/52
(52) U.S. Cl. ............................................. 710/200
(58) Field of Search .................... 710/200, 240; 709/100, 107

(56) References Cited

U.S. PATENT DOCUMENTS

| 5,442,763 | * | 8/1995 | Bartfai et al. | 710/200 |
|---|---|---|---|---|
| 5,459,871 | * | 10/1995 | Van Den Berg | 710/200 |
| 5,544,332 | * | 8/1996 | Chen | 710/108 |
| 5,764,976 | * | 6/1998 | Hsiao | 710/200 |
| 6,065,063 | * | 5/2000 | Abali | 709/242 |

\* cited by examiner

*Primary Examiner*—Glenn A. Auve
(74) *Attorney, Agent, or Firm*—Hickman Palermo Truong & Becker LLP; Marcel K. Bingham

(57) ABSTRACT

A mechanism for deadlock validation is provided. A potential deadlock is validated by detecting whether a state change has occurred in a member of a set of lock structures that correspond to entities and resources involved in a potential deadlock. The state change detected should have occurred after the state of the lock structures is captured during, for example, the generation of a wait-for graph. For purposes of illustration, potential deadlocks are identified by generating a wait-for graph and detecting cycles in the wait-for graph. While generating wait-for graphs, lock structures are accessed to determine whether a vertex in the wait-for graph should be generated, and the place of the vertex in the wait-for graph. After accessing a particular lock structure for this purpose, the lock structure's state is captured. If the state of the lock structure changes after the state is captured, then any cycle that includes the lock structure may not be valid, and a potential deadlock identified by the cycle is deemed a false deadlock.

27 Claims, 4 Drawing Sheets

DETECTING A STATE CHANGE IN A LOCK STRUCTURE TO VALIDATE A POTENTIAL DEADLOCK

FIELD OF THE INVENTION

The present invention relates to deadlock handling, and in particular, to validating potential deadlocks.

BACKGROUND OF THE INVENTION

One of the long standing challenges in computing is the detection of deadlocks. A deadlock is a state assumed by a set of entities wherein each entity in the set is waiting for the release of at least one resource owned by another entity in the set. Entities capable of owning a resource are referred to herein as possessory entities. In the context of a database system, for example, possessory entities include processes and transactions. A transaction is an atomic unit of work.

For example, a transaction T1 may seek exclusive ownership of resource R1 and R2. If R1 is available and R2 is currently exclusively owned by another transaction T2, transaction T1 may acquire exclusive ownership of R1 but must wait for R2 to become available. A deadlock will occur if a transaction T2 exclusively owns R2 but seeks ownership of R1, and T2 is suspended to wait for R1 without releasing R2. Because both T1 and T2 are waiting for each other, they are deadlocked.

Computer systems employ a variety of deadlock handling mechanisms (deadlock handlers) that detect deadlocks. Many of deadlock handlers employ the "cycle" technique to detect deadlocks. In the cycle technique, after a process waits a threshold period of time for a resource, a wait-for graph is generated and examined for any cycles. If any cycles are identified, then the deadlock detection mechanism has identified a deadlock.

A wait-for graph is a graph that includes vertices that represent resources ("resource vertices") and vertices that represent possessory entities ("entity vertices "). An arc from an entity vertex to a resource vertex represents that the respective possessory entity represented by the entity vertex is waiting for ownership of the resource. An arc from a resource vertex to an possessory entity node represents that the resource represented by the resource vertex is owned by the possessory entity. A cycle is detected when a chain of arcs leads both to and from the same vertex.

FIG. 1 shows an exemplary wait-for graph 100, which includes entity vertices 111 and 112 and resource vertices 121 and 122. Wait-for graph 100 was generated when a deadlock handler detected that the process represented by entity vertex 111 had waited a threshold period of time for the resource represented by resource vertex 121. Arc 131 represents that the process represented by entity vertex 111 is waiting for the release of the resource represented by resource vertex 121. Arc 132 represents that the resource represented by resource vertex 121 is owned by the process represented by entity vertex 112. Arc 133 represents that the process represented by entity vertex 112 is waiting for the release of the resource represented by resource vertex 122. Arc 134 represents that the resource represented by resource vertex 122 is owned by the resource represented by entity vertex 111.

Arcs 131, 132, 133, and 134 form a loop that both extends from and leads to entity vertex 111, and thus represents a cycle. The processes represented the entity vertices of wait-for graph 100 are therefore potentially deadlocked.

In practice, deadlocks detected through the cycle technique may not actually exist. One reason the cycle technique is not completely accurate is that relationships between possessory entities and resources change while a wait-for graph is being generated. For example, while in the process of generating a wait-for graph, a deadlock handler determines that arc 131 should connect entity vertex 111 to resource vertex 121 because the process represented by entity vertex 111 is waiting for the release of the resource represented by resource vertex 121. Next, the deadlock handler determines that arc 132 should connect resource vertex 121 to entity resource 112 because resource vertex 121 is owned by entity resource 112. The deadlock handler then generates the remainder of wait-for graph 100.

While generating the remainder of wait-for graph 100, the process represented by entity vertex 112 relinquishes ownership of the resource represented by resource vertex 121. Thus upon completion of the wait-for graph, arc 132 in fact represents a nonexistent relationship, and the cycle represented by arcs 131, 132, 133, and 134 represents a nonexistent deadlock.

Because deadlocks identified through the cycle technique may or may not exist, such deadlocks are subjected to further verification before they are treated as deadlocks that exist. The process of verifying the existence of previously identified deadlocks is referred to as "validation". Deadlocks that have been detected but have not yet been subjected to validation are referred to herein as potential deadlocks.

Typically, validation of a potential deadlock involves regenerating a wait-for graph, and determining whether the regenerated wait-for graph contains the same previously identified cycle. If the same cycle exists, the probability that the potential deadlock is an actual deadlock increases greatly, and the potential deadlock is handled as a deadlock. Such handling includes causing one of the possessory entities to relinquish ownership of a resource, thus "breaking the cycle." A potential deadlock that is treated as a real deadlock because its existence has been verified through validation, is referred to herein as a true deadlock.

As shown above, identifying true deadlocks may entail the generation of at least two wait-for graphs. Validating a possible deadlock without performing the amount of work required to generate a second wait-for graph would substantially improve the efficiency of performing validation. It is therefore desirable to provide a method for validation that requires less work than regenerating a wait-for graph, and in particular, requires less work without sacrificing accuracy in validating potential deadlocks.

SUMMARY OF THE INVENTION

A mechanism for deadlock validation is described. According to an embodiment of the present invention, a potential deadlock is validated by detecting whether a state change has occurred in a member of a set of lock structures that correspond to entities and resources involved in a potential deadlock. The state change detected should have occurred after the state of the lock structures is captured during, for example, the generation of a wait-for graph. For purposes of illustration, potential deadlocks are identified by generating a wait-for graph and detecting cycles in the wait-for graph. While generating wait-for graphs, lock structures are accessed to determine whether a vertex in the wait-for graph should be generated, and the place of the vertex in the wait-for graph. After accessing a particular lock structure for this purpose, the lock structure's state is captured. If the state of the lock structure changes after the state is captured, then any cycle that includes the lock structure may not be valid, and a potential deadlock identified by the cycle is deemed a false deadlock.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for validating potential deadlocks is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

FUNCTIONAL OVERVIEW

A potential deadlock is validated by detecting whether a state change has occurred in a member of a set of lock structures that correspond to entities and resources involved in a potential deadlock. Lock structures include, for example, latches, semaphores, monitors, and mutexes, and shall be described hereafter in further detail.

The set of lock structures that correspond to the entities and resources in a potential deadlock are referred to as a deadlock set. If a state change is detected for a member of the deadlock set, then it assumed that the potential deadlock does not actually represent a true deadlock. If no state change has occurred in the deadlock set, then the potential deadlock is handled as a true deadlock. Validating potential deadlocks in this manner may be at least as accurate as cycle based validation techniques. The process of determining whether a state change has occurred in any member of a deadlock set may be performed substantially quicker than generating a second wait-for graph. Thus, replacing the generation of a second wait-for graph with a lock-state test substantially increases the speed and efficiency of validating a potential deadlock, without sacrificing accuracy.

EXEMPLARY WAIT-FOR GRAPH

In an embodiment of the present invention, validation is performed on a potential deadlock initially detected using the cycle technique. For purposes of illustration, an exemplary wait-for graph is described.

Figure 1:
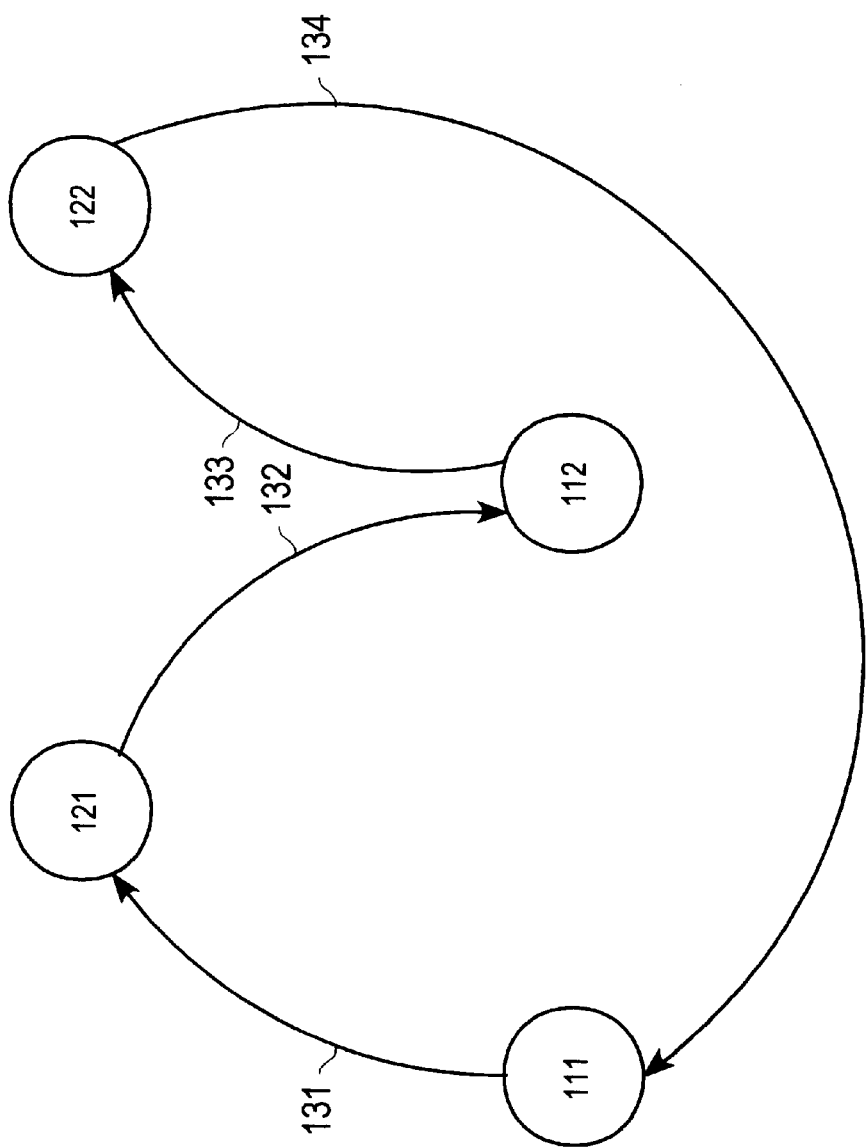
FIG. 1 is a block diagram depicting a wait-for graph.
Figure 2:
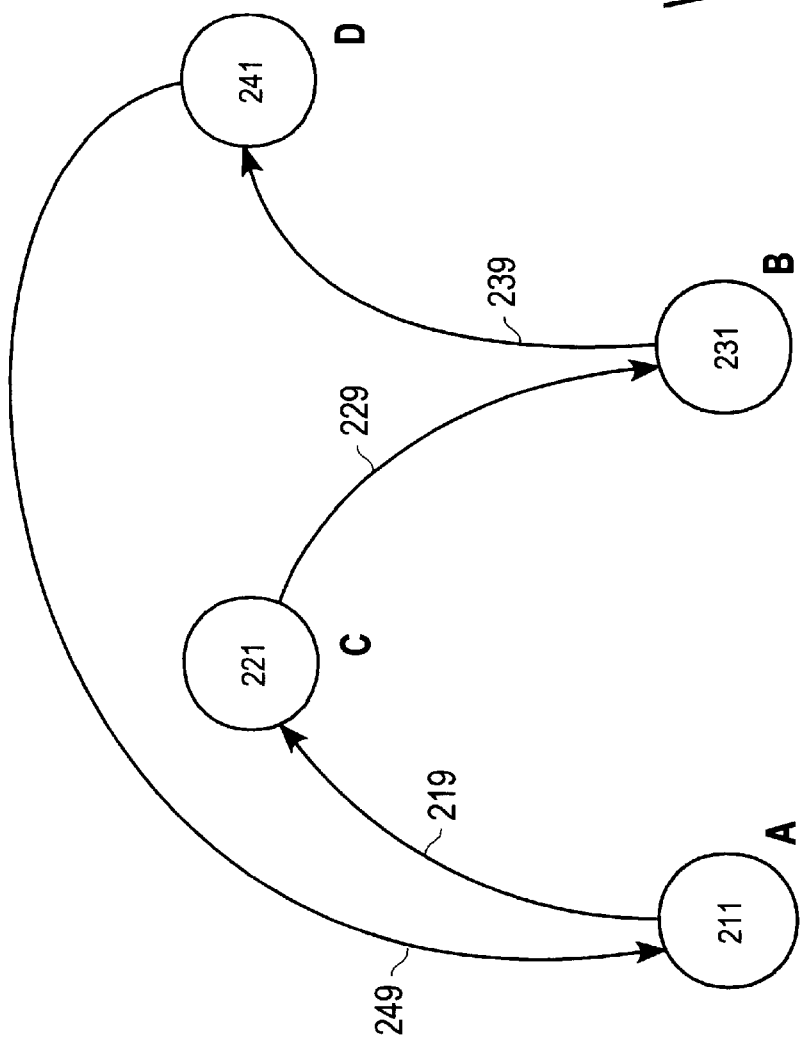
FIG. 2 is a block diagram depicting a wait-for graph according to an embodiment of the present invention.

FIG. 2 shows an exemplary wait-for graph 200, which includes entity vertices 211 and 231 and resource vertices 221 and 241. Entity vertices 211 and 231 represent transactions A and B respectively. Resource vertices 221 and 241 represent a resource C and a resource D respectively. Arc 219 represents that transaction A is waiting for the release of the resource C. Arc 229 represents that resource C is owned by the transaction B. Arc 239 represents that transaction B is waiting for the release of resource D. Arc 249 represents that resource D is owned by the transaction A. Arcs 219, 229, 239, and 249 form a loop that both extends from and leads to entity vertex 211, and thus represents a cycle.

To form a wait-for graph 200, a deadlock handler examines lock data structures and various lists that contain lock structures (e.g. grant queues and convert queues) that are used to manage access to resources. From this information, the deadlock handler generates wait-for graph elements. Wait-for graph elements are data structures used to represent wait-for graphs, and in particular, vertices in a wait-for graph and their relationship to each other.

Figure 3:
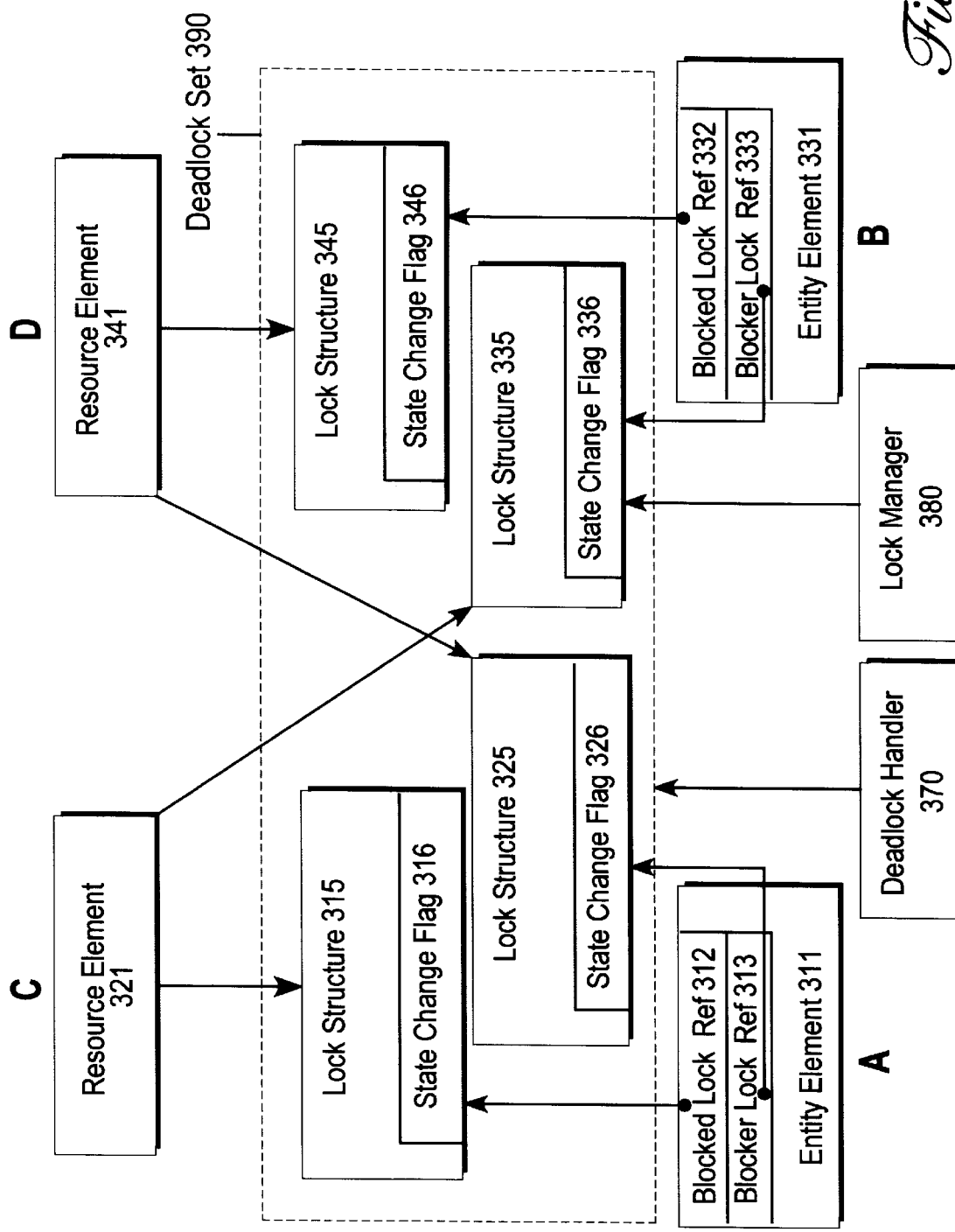
FIG. 3 is a block diagram depicting wait-for graph elements and lock structures according to an embodiment of the present invention.

FIG. 3 shows wait-for graphs elements used to represent a wait-for graph 200. Specifically, resource elements 321 and 341 represent resource vertices 221 and 241, which correspond to resource C and D respectively. A resource element may contain data describing arcs that lead to and from the resource vertex represented by the resource element.

Entity elements 311 and 331 represent entity vertices 211 and 231, which correspond to transaction A and B respectively. An entity element may contain data describing the arcs that lead to and from the entity vertices represented by the entity element.

Lock structures, like lock structures 315, 325, 345, and 335, are data structures that are used to represent the state of ownership by an entity over a resource. A lock data structure contains data that, for example, (1) identifies the entity whose state of ownership the lock structure represents, (2) identifies the resource in issue, (3) specifies whether the entity is waiting for or owns the resource, and (4) indicates the type of ownership requested or granted (e.g. shared or exclusive). In addition, lock structures may contain references to each other that are used to form various lists for managing access to a resource, such as convert queues or a grant queues.

Lock manager 380 is a mechanism which participates in managing access to resources by managing lock structures. The lock manager maintains lock structures so that the states of each reflects the state of ownership of an entity over a resource.

INFORMATION THAT IS USED TO DETERMINE A DEADLOCK SET

The techniques for deadlock validation described herein involve detecting whether a state change has occurred in at least one lock structure in a deadlock set. There is thus a need for a mechanism to determine the members of a deadlock set. According to an embodiment of the present invention, the deadlock set may be determined by examining information gathered while generating wait-for graph elements used to represent a wait-for graph.

FIG. 3 shows data structures that are provided as an example to illustrate how information that is collected while generating a wait-for graph may be used to determine the members of a deadlock set. Referring to FIG. 3, entity element 311 contains blocked lock reference 312 and blocker lock reference 313, and entity element 331 contains blocked lock reference 332 and blocker lock reference 333. A lock reference is a reference to a lock data structure (e.g. pointer).

A blocked lock reference is a reference to a blocked lock structure. A blocked lock structure is a lock structure that represents an entity waiting for ownership of a resource owned by another entity, where the type of ownership by the other entity prevents the type of ownership requested by the waiting entity from being granted. Blocked lock reference 312 refers to lock structure 315, which is a blocked lock structure. Lock structure 315 represents that transaction A is waiting for ownership of resource C. Transaction B, for example, exclusively owns resource C, thus blocking transaction A from getting the ownership.

A blocker lock reference is a reference to a blocker lock structure. A blocker lock structure is a lock structure that represents ownership by a given entity, where the type of ownership by the given entity is "blocking" the type of ownership requested by another entity. The other entity may be waiting for the given entity to release the resource. Lock reference 313 refers to lock structure 325, which is a blocker lock structure. Blocker lock structure 325 represents a type of lock that is blocking the ownership of transaction B of resource D. It represents that the resource D is exclusively owned by transaction A.

IDENTIFYING MEMBERS OF THE DEADLOCK SET

The members of the deadlock set can be determined by identifying the lock structures that are involved in a cycle. Specifically, the members of a deadlock set may be identified by determining which lock structures are referred to by the elements that represent vertices that form a cycle in a wait-for graph. So that members of a deadlock set may be later examined to determine whether a state chance has occurred in any of them, references to the members of the deadlock set are stored.

In this example, entity elements 311 and 331 and resource elements 321 and 341 are involved in a cycle. The lock structures referred to by entity elements 311 and 331 are involved in the cycle. Lock references 312, 313, 332, and 333 refer to lock structures 315, 325, 345, and 335 respectively. Thus, lock structures 315, 325, 345, and 335 form a deadlock set 390.

To record the members of the deadlock set, a deadlock handler may store entity elements 311 and 331 because each contain a references to the member of the just determined deadlock set. Alternatively, the deadlock handler may extract references to the members of the deadlock set from the elements in the wait-for graph that refer to the deadlock set, and store the extracted references.

While the identification of the members of a deadlock set has been illustrated using a technique that involves identifying lock structures referenced by wait-for graphs that include entity vertices and resource vertices, other techniques for identifying deadlock set members that use other types of wait-for graphs are possible. For example, another type of wait-for graph may only contain entity vertices. An arc that leads from a given entity vertice to another entity vertice represents that the given entity is waiting for the other entity to release a resource.

In addition, there may be other techniques for identifying members of a deadlock set that do not involve generating wait-for graphs. Therefore, it is understood that the present invention is not limited to any particular technique for generating wait-for graphs or identifying deadlock set members.

DETECTING STATE CHANGES TO A MEMBER OF A DEADLOCK SET

The techniques for deadlock validation described herein involve detecting whether a state change occurred in at least one member lock structure of a deadlock set after capturing the state of the member lock structure. Capturing the state of a lock structure refers to recording information that may be subsequently used to determine whether the state of a lock structure has been changed. According to an embodiment of the present invention, a state change is detected for a lock structure after the state of that lock structure is captured during cycle detection. More specifically, the state of the lock structure is captured when a wait-for graph element that refers to a lock structure is added to wait-for graph 200.

A state change flag may be used to capture the state of the lock structure. A state change flag is managed so that the state change flag indicates whether or not the state of the lock structure that contains the flag has been modified between the time the lock structure was accessed for cycle identification and the time that validation is performed. In FIG. 3 for example, lock structure 315 includes state change flag 316, lock structure 325 includes state change flag 326, lock structure 335 includes state change flag 336, and lock structure 345 includes state change flag 346. State change flags 316, 326, 336, and 346 may be bit flags.

When during cycle detection a wait-for graph element that refers to a lock structure is created and added to the wait-for graph, the state change flag of the lock structure is set to a particular value. Subsequently, if there is a change in the ownership (blocked/blocker status) of a lock structure the lock manager process modifies its state change flag, setting it to another value. Thus, for any lock structure referenced by a wait-for graph element that corresponds to a cycle, the updated flag indicates the lock structure state has changed after the state was captured during cycle detection.

After detecting a cycle, recording the members of a deadlock set and capturing their states, the deadlock handler examines the state change flags of the members of the deadlock set. The deadlock handler detects whether the state of a deadlock set member has changed by determining whether the state change flag of the member is set to the other value.

Referring to FIG. 3, deadlock handler 370 is a mechanism that first detects potential deadlocks and then validates them through the use of state change flags. For purposes of illustration, assume that the deadlock handler has added wait-graph elements 311 and 331 to wait-for graph 200, has set their state change flags 316 and 326 to zero, and has recorded the members of the deadlock set by storing references to lock structures 315, 325, 335 and 336 in entity elements 311 and 331.

After the state change flag 336 of lock structure 335 has been set to zero and before completing wait-for graph 200, transaction B releases resource C. The lock manager 380 removes lock structure 335 from a grant queue for resource C, and modifies lock structure 335 to indicate that transaction B no longer owns resource C. In addition, lock manager 380 modifies the value of the state change flag 336 to one.

After wait-for graph 200 has been completed, the cycle it represents is identified, and the members of deadlock set 390 are recorded. The deadlock handler 370 does deadlock validation to validate the potential deadlock represented by deadlock set 390. Deadlock handler 370 examines the deadlock set 390 members. When deadlock handler 370 validates lock structure 335, the deadlock handler determines that state change flag 336 is set to a value of one, signaling that the state of lock structure 335 has changed. Thus the potential deadlock represented by deadlock set 390 is in fact not a true deadlock.

The use of the state-change flag is only one technique for determining whether the state of any members of a deadlock set have changed. Other techniques are possible. Therefore, it is understood that the present invention is not limited to any particular technique for determining whether the state of a lock structure has changed.

DISTRIBUTED DEADLOCKS

In a distributed computer system, a deadlock may involve entities and resources that reside on multiple nodes. Potential deadlocks are detected through the generation of distributed wait-for graphs. The vertexes of a distributed wait graph represent entities ("distributed entities") and resources ("distributed resources") that reside on different nodes. To generate a distributed wait-for graph, each node generates a portion of the wait-for graph that corresponds to entities that reside on the node. In particular, each node examines lock data structures that reside on the node, and generates wait-for graph elements that represent the node's portion of the distributed wait-for graph.

A cycle in a distributed wait-for graph may thus include vertices that represent entities and resources distributed over multiple nodes. In addition, the cycle may be represented by wait-for graph elements distributed over multiple nodes and which refer to lock structures that reside on the multiple nodes. The subset of lock structures of a deadlock set that reside on the node are referred to as local members with respect to that node.

The tasks of setting the values of the state change flags of the deadlock set is distributed to the set of nodes ("node set") on which members of the deadlock set reside. Each of the node set members is responsible for identifying local members, recording them, and setting the state change flags of the local members.

When the deadlock validation process is commenced, a deadlock handler on one of the node set members becomes responsible for coordinating the task of determining whether the state of any of the deadlock set members has changed. Specifically, the coordinating deadlock handler determines whether the state of its local members has changed. If not, then the coordinating deadlock handler transmits a validation request to another node, which returns a response that indicates whether the state of any local member on that node has changed. The coordinator deadlock handler then transmits a validation request to another node in the node set until there are no nodes left, or until the coordinating deadlock handler receives a response from a node indicating that a state change in a local member has been detected.

HARDWARE OVERVIEW

Figure 4:
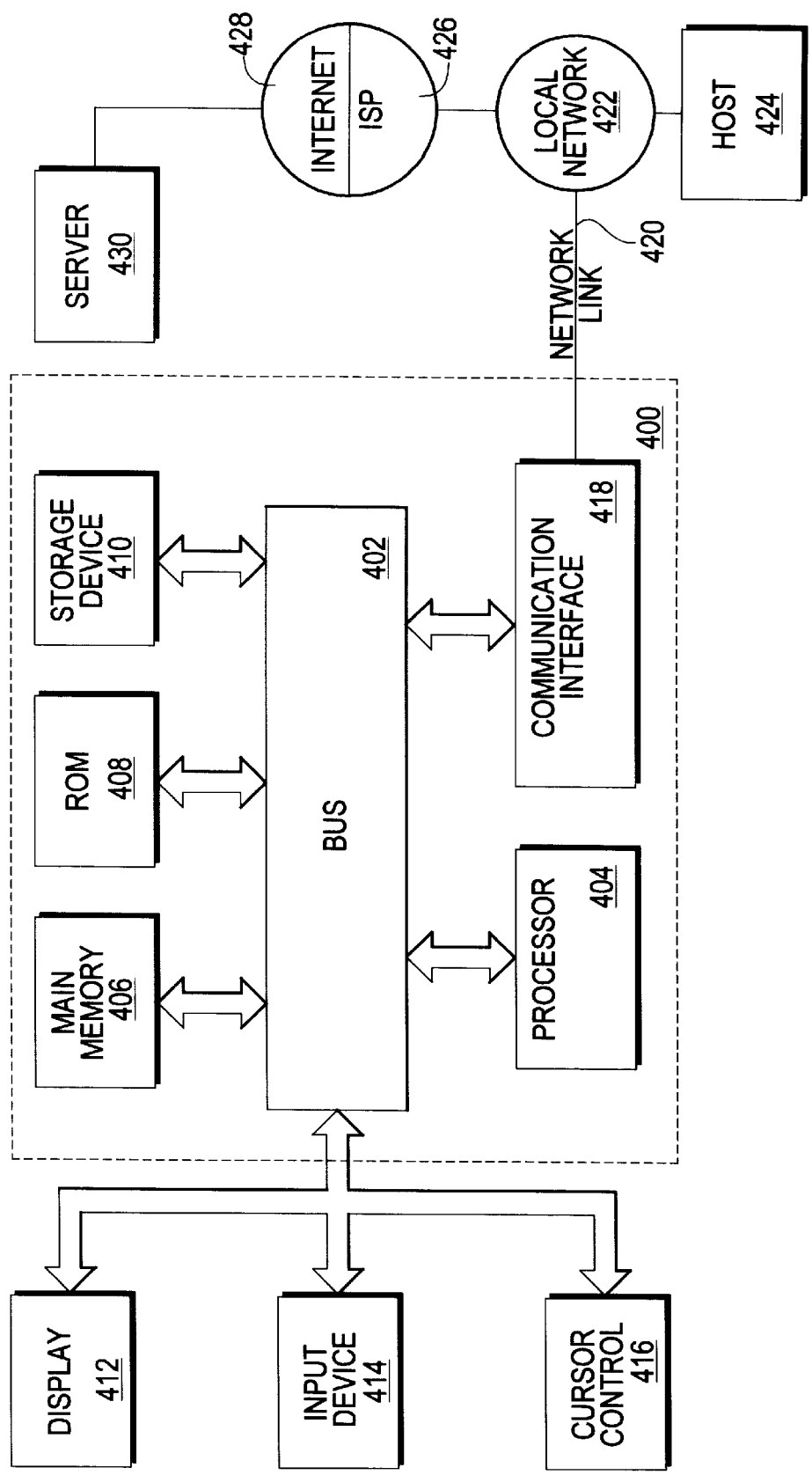
FIG. 4 is a block diagram depicting a computer system upon which an embodiment of the present invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for validating potential deadlocks. According to one embodiment of the invention, validating potential deadlocks is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for validating potential deadlocks as described herein.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of handling deadlocks, the method comprising the steps of:
   identifying a set of lock structures that are involved in a potential deadlock,
      wherein each lock structure of said set of lock structures has a state;
   capturing the state of at least one lock structure of said set of lock structures;
   determining whether the state of said at least one lock structure has changed after
      capturing the state of said at least one lock stricture; and
   establishing said potential deadlock as a false deadlock if the state of said at least one lock structure has changed.

2. The method of claim 1, wherein the step of identifying a set of lock structures includes the steps of:
   identifying a cycle in a wait-for graph; and
   identifying lock structures which correspond to said cycle.

3. The method of claim 2, wherein the step of identifying a cycle includes identifying a cycle in a wait-for graph that includes vertices for resources and vertices for entities that request access to said resources.

4. The method of claim 1, wherein:
   the step of capturing the state of at least one lock structure includes setting a flag in a particular lock structure; and
   the step of determining whether the state of said at least one lock structure has changed includes determining whether said flag indicates that the state of said particular lock structure has changed.

5. The method of claim 4, wherein
   the step of setting a flag includes setting a flag to a first value; and
   the method further includes the steps of
      after setting said flag to a first value, performing operations upon said particular lock structure that relate to managing access to a resource associated with said particular lock structure; and
      setting said flag to a second value as part of performing said operations.

6. The method of claim 5, wherein the step of establishing said potential deadlock as a false deadlock if the state of said at least one lock structure has changed includes establishing said potential deadlock as a false deadlock if said flag is set to said second value.

7. The method of claim 1, wherein the step of identifying a set of lock structures includes identifying lock structures that correspond to a set of distributed resources.

8. The method of claim 1, wherein
   the method further includes the step of storing a set of references to said set of lock structures; and
   the step of determining whether the state of said at least one lock structure has changed includes examining a particular lock structure referenced by said set of references to determine whether the state of said particular lock structure has changed.

9. The method of claim 8, wherein the step of storing a set of references includes storing elements in a wait-for graph that each contain at least one reference to a member of said set of lock structures.

10. A computer-readable medium carrying one or more sequences of one or more instructions for handling deadlocks, the one or more sequences of one or more instructions including instructions which, when executed by one or more processors, cause the one or more processors to perform the steps of:
   identifying a set of lock structures that are involved in a potential deadlock,
      wherein each lock structure of said set of lock structures has a state;
   capturing the state of at least one lock structure of said set of lock structures;
   determining whether the state of said at least one lock structure has changed after capturing the state of said at least one lock structure; and
   establishing said potential deadlock as a false deadlock if the state of said at least one lock structure has changed.

11. The computer-readable medium of claim 10, wherein the step of identifying a set of lock structures includes the steps of:
   identifying a cycle in a wait-for graph; and
   identifying lock structures which correspond to said cycle.

12. The computer-readable medium of claim 11, wherein the step of identifying a cycle includes identifying a cycle in a wait-for graph that includes vertices for resources and vertices for entities that request access to said resources.

13. The computer-readable medium of claim 10, wherein:
the step of capturing the state of at least one lock structure includes setting a flag in a particular lock structure; and
the step of determining whether the state of said at least one lock structure has changed includes determining whether said flag indicates that the state of said particular lock structure has changed.

14. The computer-readable medium of claim 13, wherein
the step of setting a flag includes setting a flag to a first value; and
the computer-readable medium further includes sequences of instructions for performing the steps of
after setting said flag to a first value, performing operations upon said particular lock structure that relate to managing access to a resource associated with said particular lock structure; and
setting said flag to a second value as part of performing said operations.

15. The computer-readable medium of claim 14, wherein the step of establishing said potential deadlock as a false deadlock if the state of said at least one lock structure has changed includes establishing said potential deadlock as a false deadlock if said flag is set to said second value.

16. The computer-readable medium of claim 10, wherein the step of identifying a set of lock structures includes identifying lock structures that correspond to a set of distributed resources.

17. The computer-readable medium of claim 10, wherein
the computer-readable medium further includes sequences of instructions for performing the step of storing a set of references to said set of lock structures; and
the step of determining whether the state of said at least one lock structure has changed includes examining a particular lock structure referenced by said set of references to determine whether the state of said particular lock structure has changed.

18. The computer-readable medium of claim 17, wherein the step of storing a set of references includes storing elements in a wait-for graph that each contain at least one reference to a member of said set of lock structures.

19. A computer system, comprising:
one or more processors;
multiple lock structures;
said one or more processors configured to identify a set of lock structures from said multiple lock structures that is involved in a potential deadlock,
wherein each lock structure of said set of lock structures has a state;
said one or more processors configured to capture the state of at least one lock structure of said set of lock structures;
said one or more processors configured to determine whether the state of said at least one lock structure has changed after capturing the state of said at least one lock structure; and
said one or more processors configured to establish said potential deadlock as a false deadlock if the state of said at least one lock structure has changed.

20. The computer system of claim 19, further comprising:
said one or more processors configured to identify a cycle in a wait-for graph; and
said one or more processors configured to identify lock structures which correspond to said cycle.

21. The computer system of claim 20, wherein said one or more processors are configured to identify a cycle in a wait-for graph by performing steps that include testifying a cycle in a wait-for graph that includes vertices for resources and vertices for entities that request access to said resources.

22. The computer system of claim 19, wherein:
said one or more processors are configured to capture the state of at least one lock structure by performing one or more steps that include setting a flag in a particular lock structure; and
said one or more processors are configured determine whether the state of said at least one lock structure has changed by performing one or more steps that include determining whether said flag indicates that the state of said particular lock structure has changed.

23. The computer system of claim 22, wherein
said one or more processors are configured to set the flag in a particular lock structure to a first value; and
said one or more processors are configured to:
perform, after setting said flag to a first value, operations upon said particular lock structure that relate to managing access to a resource associated with said particular lock structure; and
set said flag to a second value as part of performing said operations.

24. The computer system of claim 23, wherein said one or more processors are configured to establish said potential deadlock as a false deadlock if the state of said at least one lock structure has changed by performing one or more steps that include establishing said potential deadlock as a false deadlock if said flag is set to said second value.

25. The computer system of claim 19, wherein said one or more processors are configured to identify a set of lock structures by performing one or more steps that include identifying lock structures that correspond to a set of distributed resources.

26. The computer system of claim 19, wherein:
said one or more processors are configured to store a set of references to said set of lock structures; and
said one or more processors are configured to determine whether the state of said at least one lock structure has changed by performing one or more steps that include examining a particular lock structure referenced by said set of references to determine whether the state of said particular lock structure has changed.

27. The computer system of claim 26, wherein said one or more processes are configured to store a set of references by performing one or more steps that include storing elements in a wait-for graph that each contain at least one reference to a member of said set of lock structures.

* * * * *